United States Patent [19]
Fröhlich et al.

[11] Patent Number: 6,052,504
[45] Date of Patent: Apr. 18, 2000

[54] HOOD SLEEVE

[75] Inventors: Franz-Friedrich Fröhlich; Wolf Kluwe, both of Hagen; Hans-Jürgen Meltsch, Schwerte; Hans Winterhoff, Waldshat-Tiengen; Rainer Zimmer, Schalksmühle, all of Germany

[73] Assignee: RXS Kabelgarnituren GmbH, Hagen, Germany

[21] Appl. No.: 08/945,367

[22] PCT Filed: Apr. 1, 1996

[86] PCT No.: PCT/DE96/00580

§ 371 Date: Oct. 14, 1997

§ 102(e) Date: Oct. 14, 1997

[87] PCT Pub. No.: WO96/32660

PCT Pub. Date: Oct. 17, 1996

[30] Foreign Application Priority Data

Apr. 12, 1995 [DE] Germany .............................. 195 13 957

[51] Int. Cl.[7] ........................................................ G02B 6/36
[52] U.S. Cl. ............................................................. 385/134
[58] Field of Search .............................. 385/76, 134, 135, 385/138

[56] References Cited

U.S. PATENT DOCUMENTS

| 4,927,227 | 5/1990 | Bensel, III et al. ............... 350/96.2 |
| 5,479,554 | 12/1995 | Roberts ................................ 385/135 |
| 5,774,618 | 6/1998 | Jones .................................... 385/135 |

FOREIGN PATENT DOCUMENTS

| 0 120 541 | 10/1984 | European Pat. Off. . |
| 0 367 477 A2 | 5/1990 | European Pat. Off. . |
| 40 35 557 A1 | 5/1992 | Germany . |
| 43 34 022 C1 | 3/1995 | Germany . |
| WO 93/26071 | 12/1993 | WIPO . |

*Primary Examiner*—Hung N. Ngo
*Attorney, Agent, or Firm*—Hill & Simpson

[57] ABSTRACT

The invention is concerned with a hood sleeve which is formed from a sealing body and a hood body these two parts being held together with the aid of a mechanical retaining device, initially without a sealing effect. The sealing-off between the hood body and the sealing body is carried out with the aid of a seal system which is activated by a functional element, for example in the form of an eccentric.

28 Claims, 17 Drawing Sheets

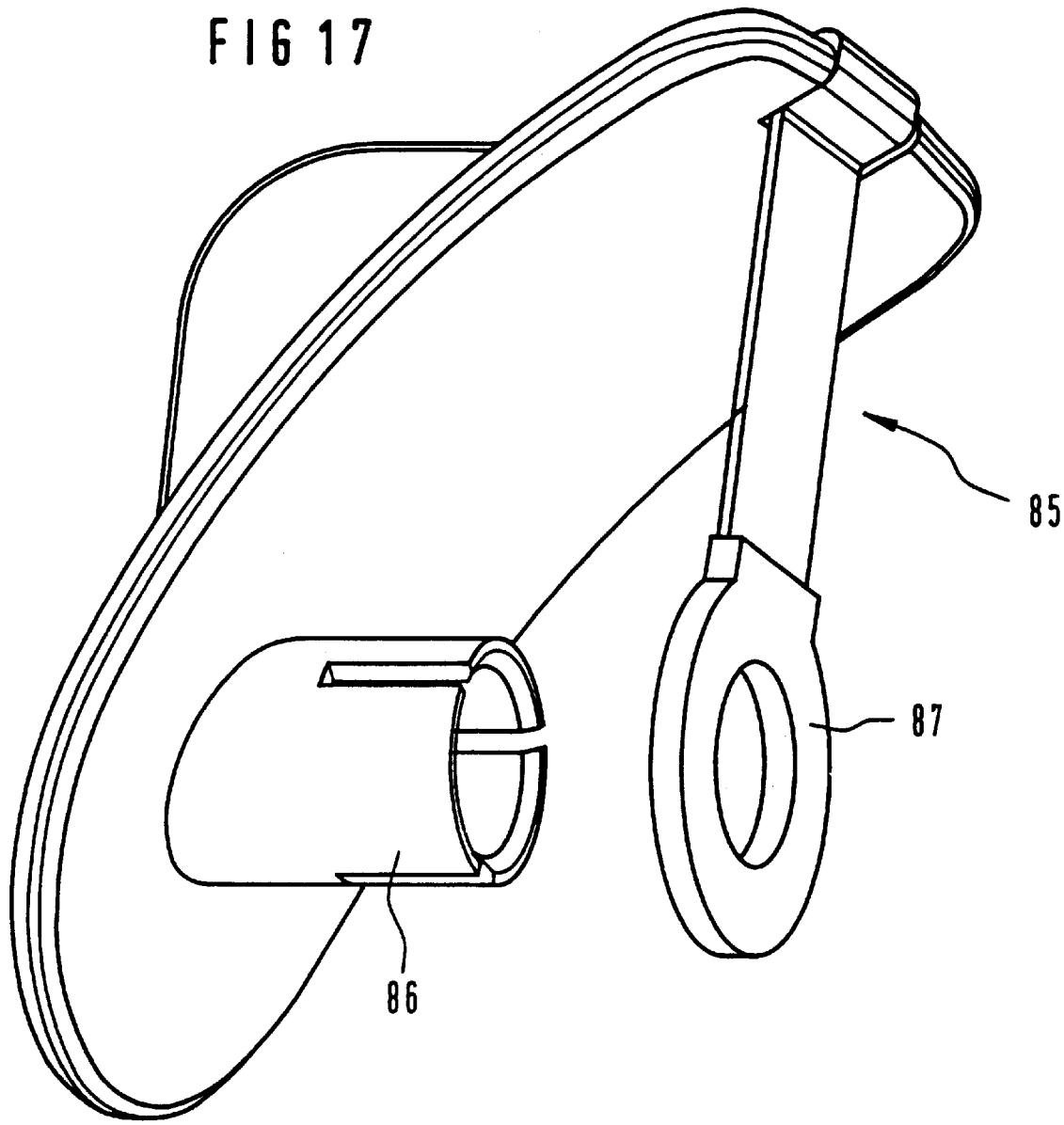

HOOD SLEEVE

BACKGROUND OF THE INVENTION

1. Field of the Invention

The invention relates to a hood sleeve comprising a hood body and a sealing body with cable inlets and an annular seal device between the hood body and the sealing body, the sealing body having a retaining device for the mechanical connection of the hood body to the sealing body.

A hood sleeve of this type is known from the German Offenlegungsschrift 40 35 557. This document concerns a hood body which is terminated at its open end with a seal body. In this case, the sealing action is undertaken using a seal system in which the necessary seal pressure is carried out by means of a clamping ring which is attached on the outside and which clamps around the hood body in the region of the seal. This clamping ring contains a trapezoidal groove, in which the flange of the hood body and of the seal body is clamped around. As a result of joining the clamping ring together, the two parts press together on a seal ring. Here, the mutual fixing of the hood body and seal body is combined with the sealing system.

The European Patent Application 0 120 541 like-wise discloses a hood sleeve in which the hood body is pressed onto the basic body with the aid of a clamping ring, an annular seal being inserted between the hood body and the basic body. The clamping ring has engagement elements which engage into corresponding mating elements of the basic body. This closure is substantially designed following the principles of a bayonet closure and the necessary seal pressure is generated by rotating the clamping ring.

SUMMARY OF THE INVENTION

The present invention addresses the object of providing a hood sleeve whose closure is initially carried out without force and separate from the seal system, it being intended to be able to be used in particular in joining optical cables, so that the requirements in relation to the clamping of the optical cables and the guidance of bundles of optical fibers within the hood sleeve are to be taken into account.

The set objective is achieved, according to the invention, with a hood sleeve of the type mentioned at the beginning in that the sealing body comprises a pressure plate and a terminating plate, which are arranged one above the other, in that the terminating plate has functional elements for the retaining device between the hood body and the sealing body, in that the seal device comprises a seal groove which runs around the circumference and varies in width and a sealing ring made of an elastomer, in that the sealing groove is formed by circumferential and interengaging profiles in the pressure plate and the terminating plate, the pressure plate and the terminating plate being movable in relation to each other for the sealing action by at least one functional element in such a way that the width of the seal groove becomes smaller and the sealing ring can be pressed in a sealing manner by means of deformation against the inner wall of the hood body, in that the hood body has functional elements, corresponding to the terminating plate, for the retaining device, in that cable inlets are each provided with a compression seal and a clamping system for a cable sheath and a central element of an optical fiber cable, in that a cassette carrier for optical fiber cassettes is arranged projecting into the interior of the hood sleeve and has fastening elements on the sealing body, in that between the sealing body and the cassette carrier a free space for the division of bundles of optical fibers is provided, in that a plurality of supply chambers is arranged on the cassette carrier for the accommodation of excess lengths of the optical multifiber units.

In the case of the hood sleeve according to the invention, advantages can be seen in particular in the fact that the hood body, following the assembly of the inner built-in fittings, is initially joined together without force using a sealing body, so that the sealing device can be operated independently thereof, in that the inserted cables, in particular optical cables, can be clamped directly at the cable inlets using their central elements, in that immediately adjacently thereafter a free space is provided in which the optical multifiber units, freed of their cable sheaths, are already combined here to form correspondingly associated "functional bundles" and are fed to a supply chamber envisaged for excess lengths, from which the bundled feeding to the appropriate cassette is then carried out. In addition, it is advantageous that the cassettes are arranged in an easily understood manner in a cassette carrier where they are movably supported in such a way that the necessary accessibility is enabled.

As a result of the fact that the sealing device between the hood body and the sealing body is carried out independently of the mechanical retaining device, for example of a bayonet closure, between the two parts, the sealing device can be designed in an optimum fashion. It essentially comprises a seal groove which varies in width and in which a soft sealing ring made of an elastomer is inserted. By means of a functional element for the sealing action, for example an eccentric lever or in the form of compression screws, the groove width is narrowed so that the inserted sealing ring is pressed against the inner wall of the hood body as a consequence of its forcible deformation.

The seals in the cable inlets are implemented as compression seals, for example as conical seals, and contain sealing rings which, following the introduction of the cables from the inner side of the sealing body, are pressed in in a sealing manner with the aid of compression rings. In addition, the cable clamping means are also provided here and contain gripping elements with which the cable sheath is in each case gripped counter to axially acting forces. These cable clamping means also contain clamping elements for the respective central element of the inserted optical cable. The advantage of this arrangement thus resides in the fact that the cable sealing and the clamping systems for the cable sheath and the respective central element are combined. In this arrangement, appropriate electrically conductive connection capabilities can also be provided, such as ground connections, for example.

A further advantage is that the cassette carrier for the individual cassettes is arranged directly on the sealing body, preferably movably, the arrangement being selected such that, between the sealing body and the cassettes arranged in the block, a free space is formed in which, as mentioned above, the leading together of the optical multifiber units from various cable entries can be carried out. This results in a functionally ordered guidance of the individually associated bundles of optical fibers, so that in the event of later service work on the sleeve, simple and easily understandable working is ensured by the good comprehensibility in the guidance of the multifiber units. The comprehensibility is also further supported to the extent that a plurality of supply chambers for bundles of optical fibers is provided, so that a further group ordering may also be achieved here in the corresponding leading together. For continuous optical multifiber units which are not at present to be spliced, and for any spare units, for example a dedicated supply chamber is provided, which expediently is arranged behind the cassettes, so that they do not get in the way during normal service work.

In an embodiment, the present invention provides a hood sleeve for accommodating a plurality of fiber optic cables that may include a plurality of optical multifiber units. The hood sleeve includes a hood body having an open end, a closed end and an inner wall. The hood sleeve also includes a sealing body that includes a terminating plate, a pressure plate and an annular sealing ring disposed therebetween. The terminating plate is attached to the open end of the hood body with the pressure plate disposed between the hood body and the terminating plate, and primarily inside the hood body. The sealing ring is disposed between the terminating plate and the pressure plate.

The terminating plate and pressure plate are movable towards one another and away from one another. When the pressure and terminating plates move towards one another, the sealing ring is compressed and is deformed radially outward so that it engages the inside wall of the hood body thereby providing the sealing engagement between the sealing ring and the inside wall of the hood body.

The terminating plate also includes a plurality of cable inlets, each cable inlet accommodates at least one fiber optic cable, each cable inlet also comprising a compression seal for providing a seal between the fiber optic cable extending through the inlet and the inlet itself.

In an embodiment, the hood sleeve of the present invention also comprises a cassette carrier for accommodating a plurality of cassettes. The carrier is disposed between the closed end of the hood body and the pressure plate. The hood sleeve also comprises an open space disposed between the pressure plate and the cassette carrier for dividing the optical fiber cables into optical multifiber units. The hood sleeve also comprises a plurality of supply chambers disposed between the cassette carrier and the inner wall of the hood body for accommodating excess lengths of the optical multifiber units.

BRIEF DESCRIPTION OF THE DRAWINGS

The invention is now explained in more detail with reference to 17 figures, in which:

FIG. 17 shows a valve cap.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENT

Figure 1:
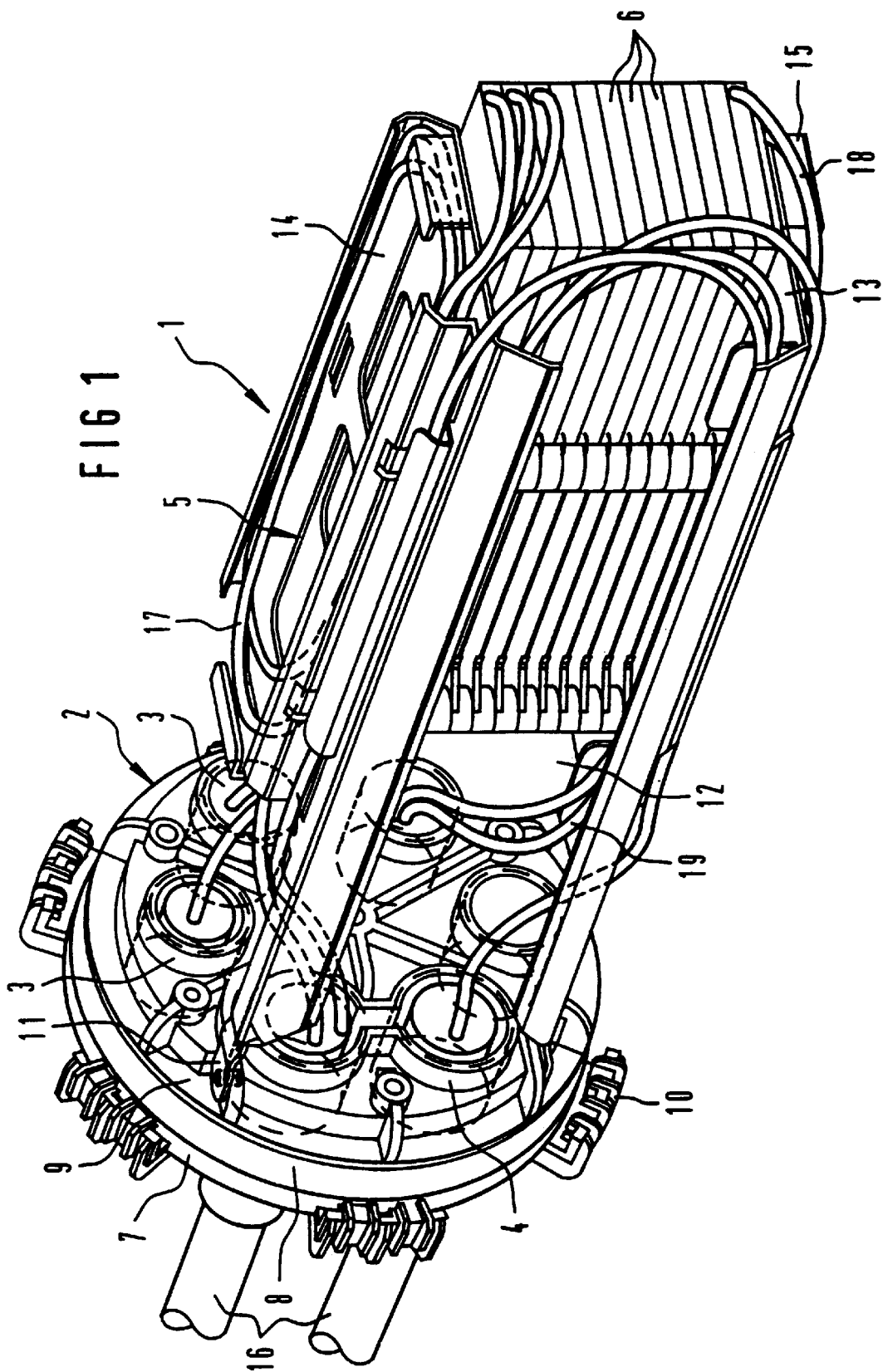
FIG. 1 shows the guidance of bundles of optical fiber wires inside the hood sleeve.

FIG. 1 illustrates the overall arrangement of the hood sleeve 1 according to the invention, the guidance of the bundles of optical fiber wires being particularly evident, on which good comprehensibility is based. The hood sleeve 1 comprises the sealing body 2 with the corresponding cable inlets 3 for individual cable entries and a cable inlet 4 for a double cable entry, for example for uncut cables, and a cassette holder 5 with the individual cassettes 6 and the hood body, which has been removed here and is therefore not shown.

The sealing body 2 comprises a terminating plate 7, located on the outside, in which the sealing systems of the cable inlets 3 and 4 are arranged, a pressure plate 9, located on the inside, which can be moved in relation to the terminating plate 7 in a manner such that the circumferential sealing groove formed between the two can be varied in width, and the sealing ring 8 which is arranged in this sealing groove. The mode of action of this sealing system will be explained in more detail later. The terminating plate 7 has on its circumference the retaining devices 10 with which the purely mechanical coherence between hood body and sealing body is produced and which is designed here, by way of example, as a bayonet closure. The cassette holder 5 is arranged directly on the seal body 2, in particular on the pressure plate 9, with the aid of fastening elements 11, this fastening also being able to be implemented in a pivotable manner. This has the advantage that the cassette holder 5 can be tilted into a favorable working position. The cassette carrier 5 is additionally designed, together with its fastening elements 11, for example in the form of elongated supports, such that a free space 12 results between the sealing body 2 and the block for the cassettes 6. Within this free space 12, the optical multifiber units, freed from their cable sheaths, can be combined into appropriately comprehensible "functional bundles" and can be routed further to the provided supply chambers 13, 14 and 15. Arranged between them is the block of cassettes 6 which, in this way, is particularly favorably accessible from all the supply chambers for the comprehensible insertion of the multi-fiber units. The cassettes 6 can be moved in relation to one another in such a way that they can be brought out of their position into a position in which all the functional parts on the cassette 6 are accessible. In this case, a plug-in mounting for the cassettes 6 is selected, so that the cassettes can be removed individually. However, a rotatable mounting of the cassettes in the cassette holder is also possible in principle.

The optical cables 16 are led in through the cable inlets 3 and 4 and clamped there, the representation of the clamping systems also being omitted here for reasons of clarity. The assembling of the "functional bundles" is carried out in the free space 12, these then being laid in the supply chambers with their excess lengths, specifically the multifiber units 17 for the upper half of the cassette block into the supply chamber 14, the multifiber units 18 for the lower half of the cassette block into the supply chamber 15 and the excess lengths of the continuous multifiber units and of the spare units 19 into the supply chamber 13.

Figure 2:
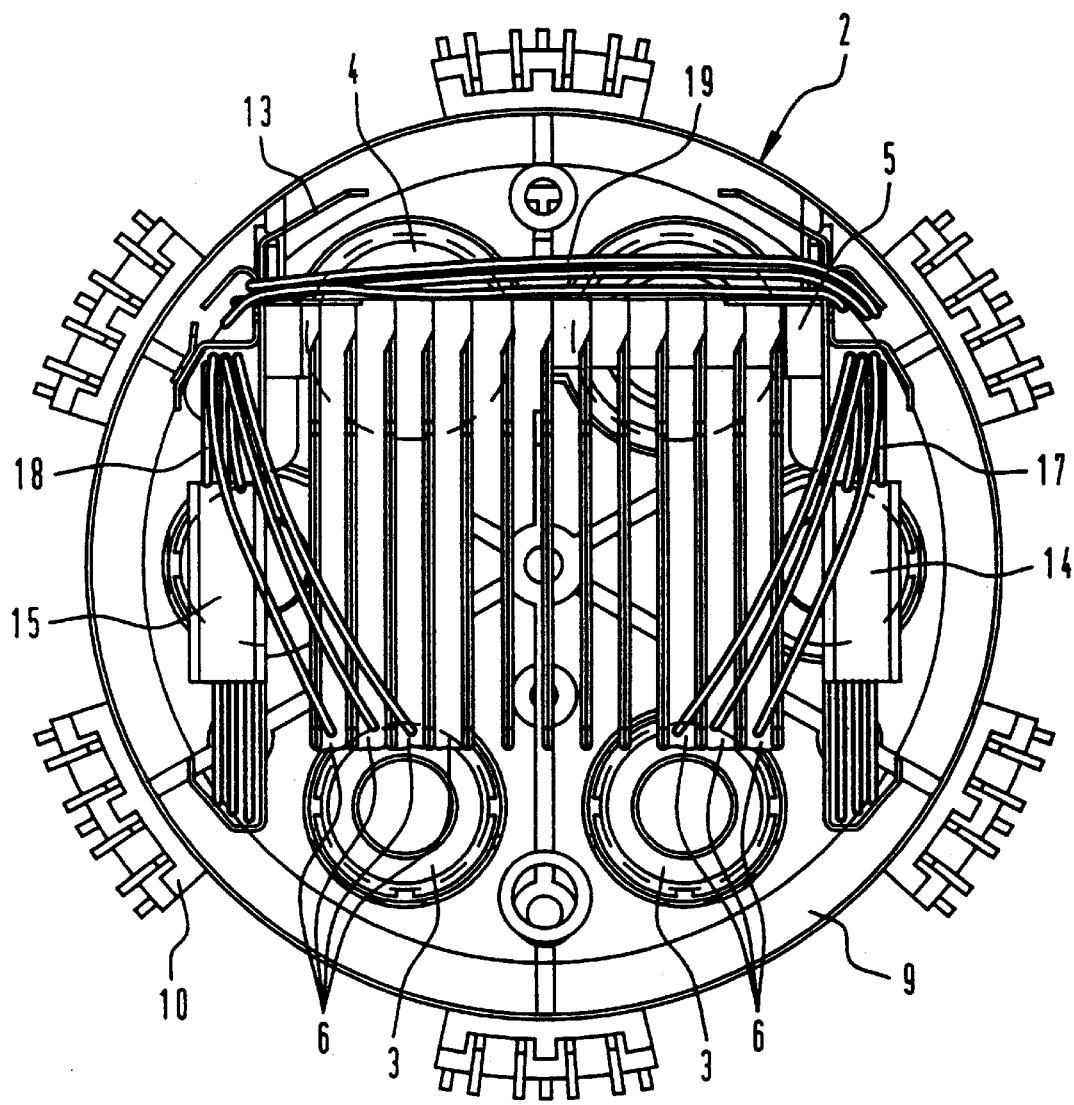
FIG. 2 shows the arrangement according to FIG. 1, viewed from inside.

FIG. 2 shows the arrangement within the hood sleeve 1 from above, that is to say viewed onto the rear of the cassette carrier 5 which is fastened to the sealing body 2. Here, the comprehensible multifiber guidance is particularly distinct; this is because no crossings of multifiber units result. The multifiber units 17 of the right supply chamber 14 are guided into the cassettes 6 of the right half of the cassette block and the multifiber units 18 from the left supply chamber 15 are guided into the cassettes 6 of the left half of the cassette block, while the excess lengths of the continuous multifiber units and spare units 19 remain in the upper supply chamber 13 or, following the deposition of the excess lengths, are guided back to the cable inlets. The supply chambers 13, 14, 15 are configured, for example, as angle-shaped bent, stamped or injection-molded parts and, using bent-over upstands at the walls, prevent optical multifiber units sliding out.

In addition, the view is given onto the pressure plate 9, through which the cable inlets 3 and 4 pass.

Figure 3:
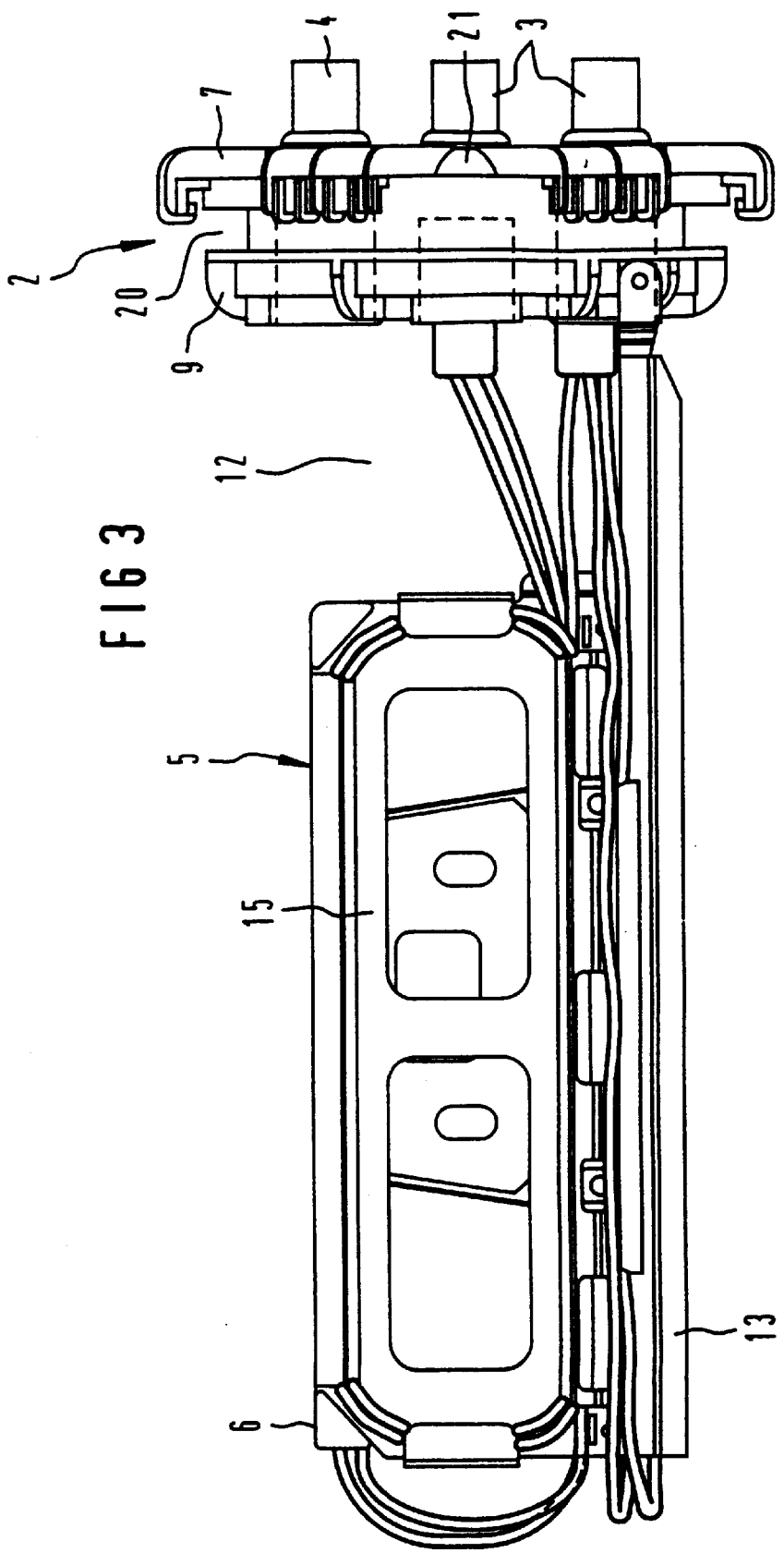
FIG. 3 shows the arrangement according to FIGS. 1 and 2 in a side view.

FIG. 3 then shows a view of the hood sleeve 1 from the side with the hood body removed. From this it can be seen that the cable inlets 3 and 4 are designed on the outside as stubs which, for example, are closed in the delivered state and are cut open only when required, so that cable inlets which are not needed remain closed. These stubs serve at the same time as kink protection for the inserted cables and in addition keep oscillations away from the cable entry seals. The sealing body 2 in the case of this exemplary embodiment further contains a central opening 21 through which, using a corresponding seal, the functional element for the sealing action, for example an eccentric lever, is guided. When this functional element is actuated, the variable sealing groove 20 formed between the covering plate 7 and the pressure plate 9 is narrowed by the pressure plate 9 being drawn toward the covering plate 7 by the functional element for the sealing action. At the same time, the sealing ring, not illustrated here, is deformed and pressed in a sealing manner against the inner wall of the hood body, not shown here.

Located between the sealing body 2 and the cassette holder 5 is the free space 12 which serves for the accommodation of the distribution of the bundles and assembling of the bundles, and of the cable clamping means, not shown here, which adjoin the cable inlets. It also becomes clear that, as a result of the measure of guiding the bundles in functional groups, good comprehensibility is ensured. In addition, the course of the excess lengths of the bundles of optical fibers within the supply chamber 15 can be seen, said units being guided at the rear end to the cassettes 6.

Figure 4:
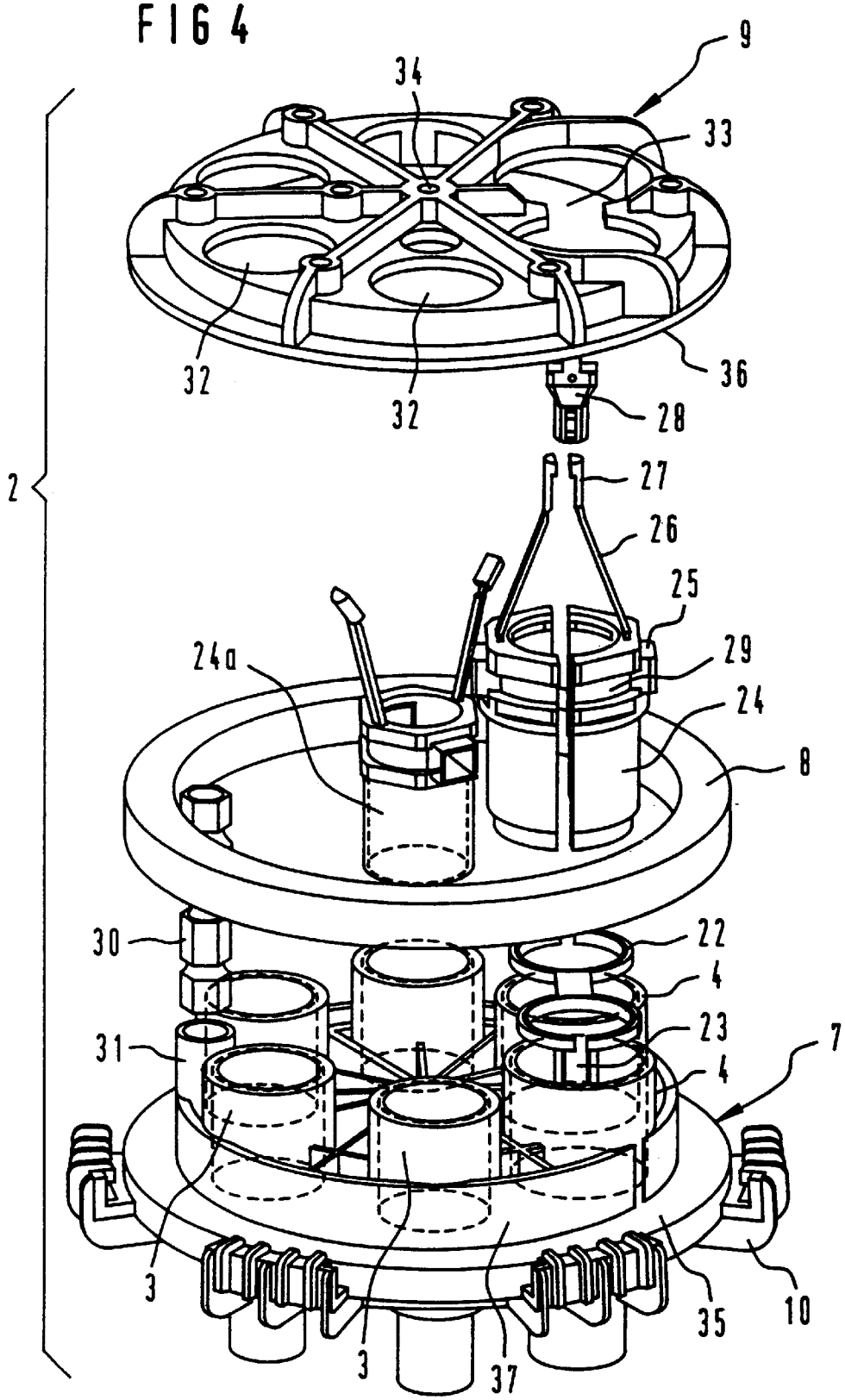
FIG. 4 shows the sealing body in individual parts.

The structure of the sealing body 2, which essentially consists of the terminating plate 7, the sealing ring 8 and the pressure plate 9, emerges from FIG. 4, all the individual parts being shown here in the non-assembled state. The terminating plate 7 has at the rim the functional elements 10 for the mechanical retaining device belonging to the hood body, a bayonet closure having stops as safeguard against overrotation being selected here. However, at this point other closure mechanisms, known per se, could also be fitted. The circumferential inner rim 35 of the terminating plate 7, together with an annular profile 37, serves as a side wall and groove base for the variable seal groove, the second side wall of which is formed by the inner rim 36 of the pressure plate 9. Lying between these as the seal is then the sealing ring 8 made of a soft elastomer with a hardness >10% Shore. In the case of this exemplary embodiment, serving as the functional element for the sealing action is an eccentric lever which is inserted in a central bored hole 34 and is led to the outside through the terminating plate 7 through a bored hole which cannot be seen here. When this functional element is set into action, the pressure plate 9 is pulled toward the terminating plate 7, the variable seal groove becomes narrower, the sealing ring 8 deforms and is thereby pressed in a sealing manner against the inner wall of the hood body. In an embodiment, the functional element may be provided in the form of a screw that connects the terminating plate 7 to the pressure plate 9. The screw can pass through the terminating plate 7, preferably through a centralized hole therein, and be threadably connected to the pressure plate 9. Rotation of the screw therefore draws the pressure plate 9 towards the terminating plate 7 resulting in a compression of the sealing ring 8.

Fitted in the terminating plate 7 are the cable inlets 3 and 4, which are lengthened to the outside as stubs. Inserted into the normal cable inlets 3 are cables which end or are spliced in the hood sleeve. Continuous and therefore not cut cables or else only individual continuous wires or bundles of a cable are inserted through the double cable inlet 4, in which two cylindrical holes are connected to each other by an open connecting web 23. In this way, the cable can be inserted uncut through the two cylindrical holes and the open connecting web 23. The sealing of the cable inlets 3 and 4 is carried out using compression seals which are formed from elastomeric sealing rings in cylindrical or conical form and from a pressure piece 24 or 24a, which under certain circumstances can also be divided. For safety, stops are provided in order to prevent overrotation of the pressure pieces, which are designed as sleeve elements. At these cable inlets 3 and 4, according to the invention, the clamping processes for the cable sheath and for the central element of an optical cable are now undertaken at the same time. In the case of this design, cylindrical sleeve elements 24 and 24a are used as clamping means for the seals in closed or divided form, and compress the cable inlet seals by being screwed into the projecting threads of the cable inlets 3 and 4. These cylindrical sleeve elements 24 and 24a contain radial openings into which pressure pieces 25 project. Using clamping bands, which are clamped into the circumferential grooves 29 provided, the pressure pieces 25 are pressed into the surface of the inserted cable sheath, so that they are gripped in a manner safe against slippage. Attached here to the inwardly pointing rim of the cylindrical sleeve element 24 or 24a, as clamping system for the respective central element of an optical cable, are at least two elongated attachments 26, which are led together at the end, where the ends 27, together with a sleeve 28 which can be plugged on, form the clamping means for the central element projecting out of the cable. The pluggable sleeve 28 is additionally designed as an electrically conductive contact element. In the case of the exemplary embodiment shown, the functions for compressing the seal, clamping the cable sheath and clamping the central element are thus combined in the pressure pieces 24 and 24a designed as sleeve elements.

Furthermore, an opening 31 for a ground potential leadthrough 20 is provided in the terminating plate 7. Provided for all these insertions in the pressure plate 9 at the appropriate points are openings 32 and 33, through which the inserted elements can be led in an unimpeded manner, so that the pressure plate 9 can be moved without hindrance in order to tension the annular seal.

Furthermore, it is shown that the double seal in the cable inlet 4 and the connecting web contains a pressure piece 22, with which the double seal is pressed down. This is carried out using two sleeve elements 24 and 24a.

Figure 5:
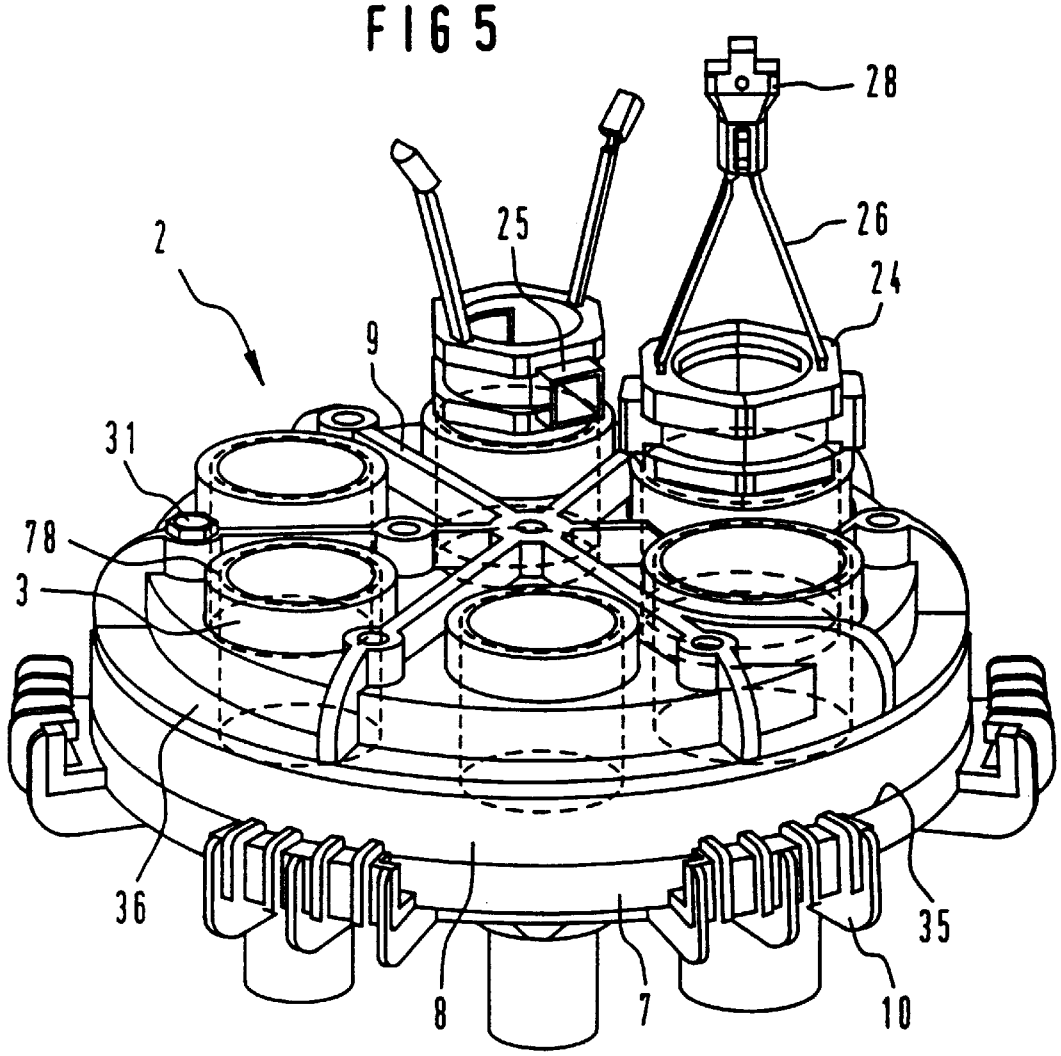
FIG. 5 shows the sealing body in the assembled state.

In FIG. 5, the sealing body 2 is shown in the assembled state, the configuration of the seal system comprising the two rims 35 and 36 of the terminating plate 7 and of the pressure plate 9 and the sealing ring 8 lying between them, in particular, being able to be seen here. Here, the insertion of the clamping systems for the cable sheaths and the central elements in the cable inlets 3 and 4, together with the press-in pressure pieces 25, also becomes clear. In the remaining cable inlets, grooves 78 for rotational securing of the sleeve elements 24 and 24a can be seen.

Figure 6:
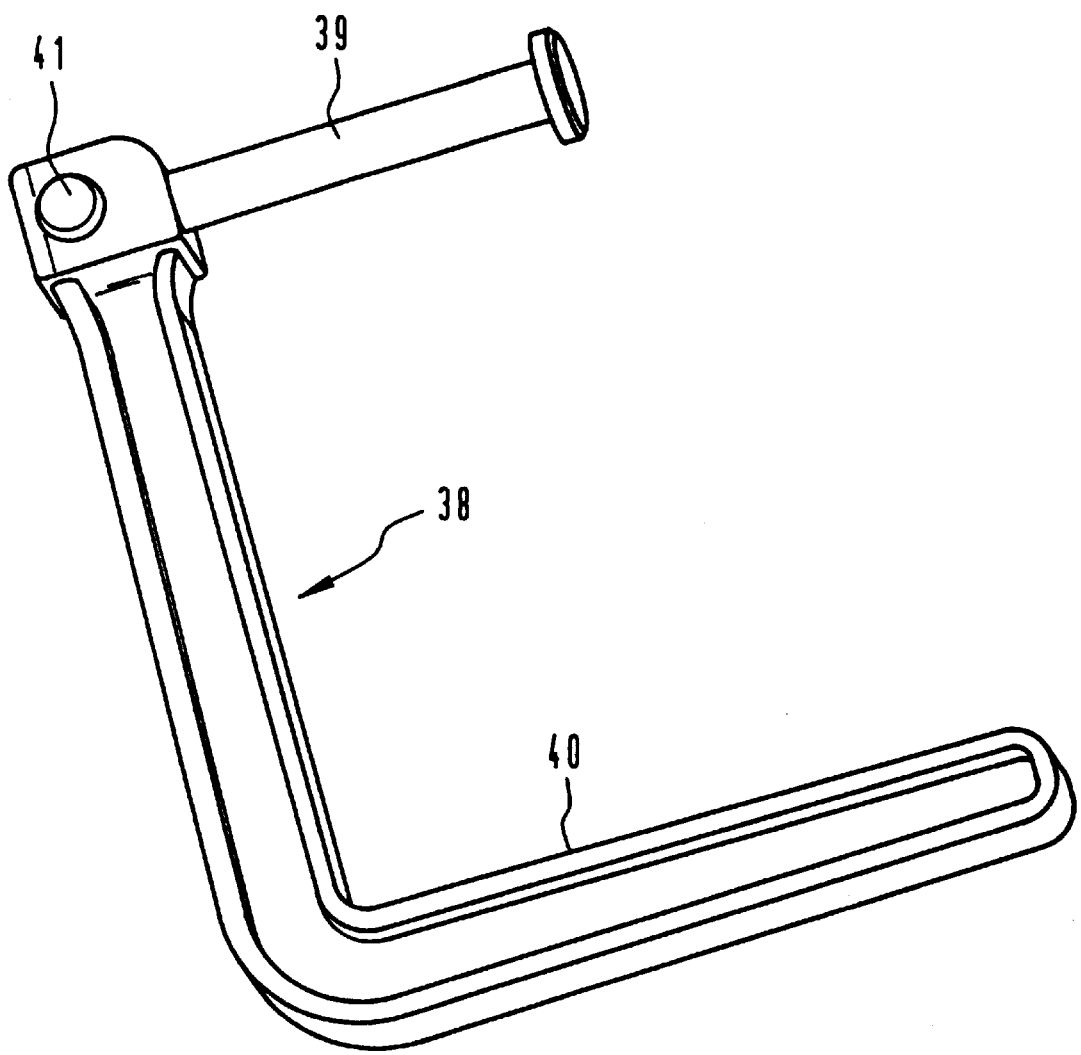
FIG. 6 shows the functional element for the sealing system.

FIG. 6 shows a functional element for the sealing action, which in this case is designed as an eccentric lever 38. The actuation of the pressure plate is carried out in this case by the pin 39, which projects axially into the hood sleeve through the terminating plate and engages in the bored hole 34 (see FIG. 4) in the pressure plate 7. This pin 39 is led through an elastic seal in the terminating plate 7 to the outside, where there is a joint 41 with an eccentric. By moving the lever 40, the pin 39 is pulled toward the outside and thereby presses the pressure plate 9 against the terminating plate 7. The lever 40 is finally fixed on the hood body after having been moved and may have a lead seal fitted. The leadthrough seal for the pin 39 comprises a silicone element which is activated when the functional element is actuated. However, screws or similar elements may be used as functional elements, which under certain circumstances could be actuated by a flexible extension. Markings, which indicate whether the sleeve is open or closed, are expediently provided.

Figure 7:
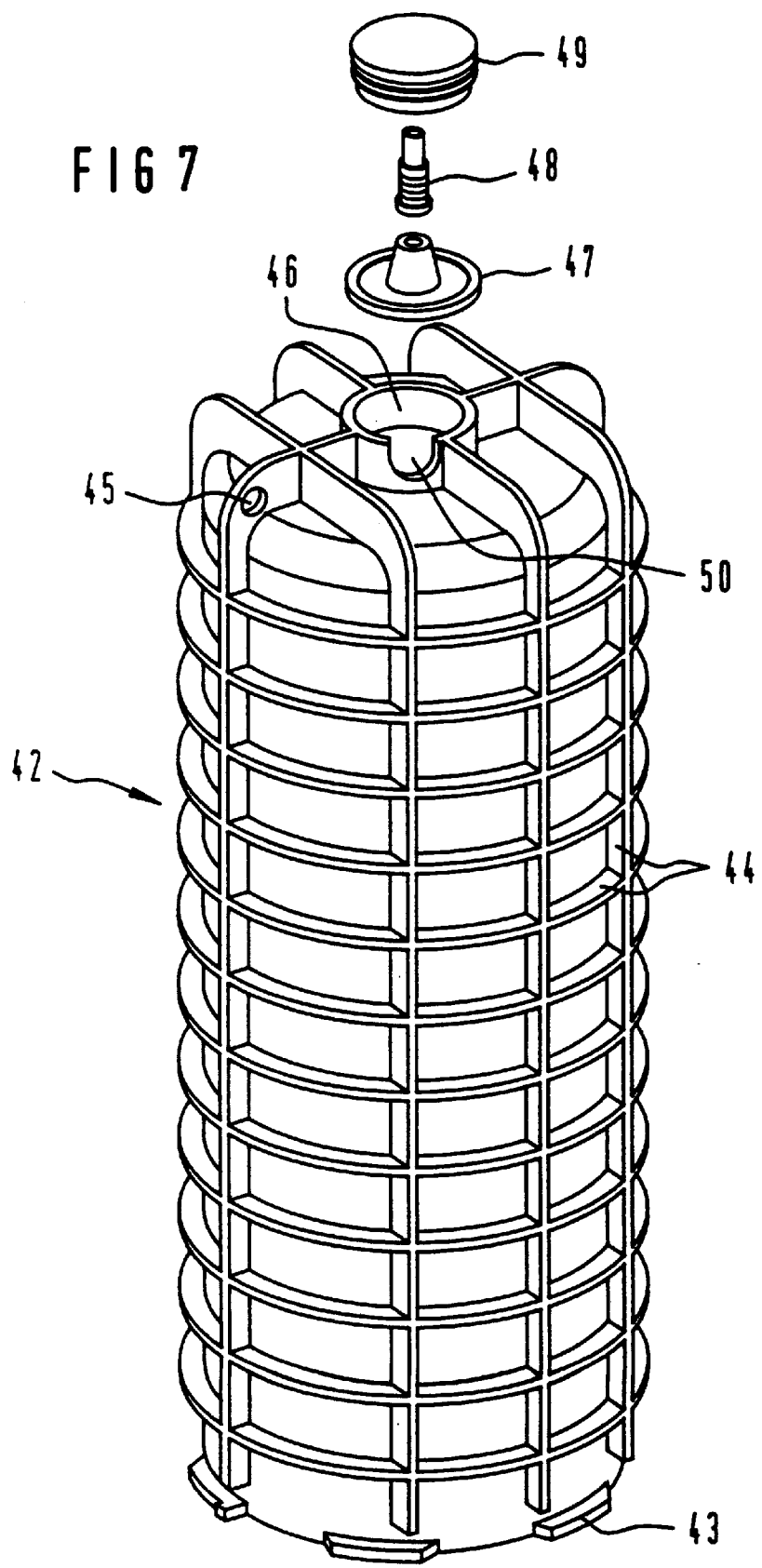
FIG. 7 shows the hood body.

FIG. 7 shows the hood body 42, which is connected to the sealing body with the aid of the functional elements, corresponding to the sealing body, for the mechanical retention, here in the form of attachments 43 for a bayonet closure. The hood body 42 is provided with longitudinally extending and circumferential ribs 44 for reinforcement, corresponding retaining capabilities in the form of bored holes or holes 45, attachments or the like being arranged as required. Provided at the upper end of the hood body 42 is a valve opening 46, in which a seal insert 47 having a valve 48 and a closure cover 49 can be inserted. A cutout 50 is arranged at the rim of the valve opening.

Figure 8:
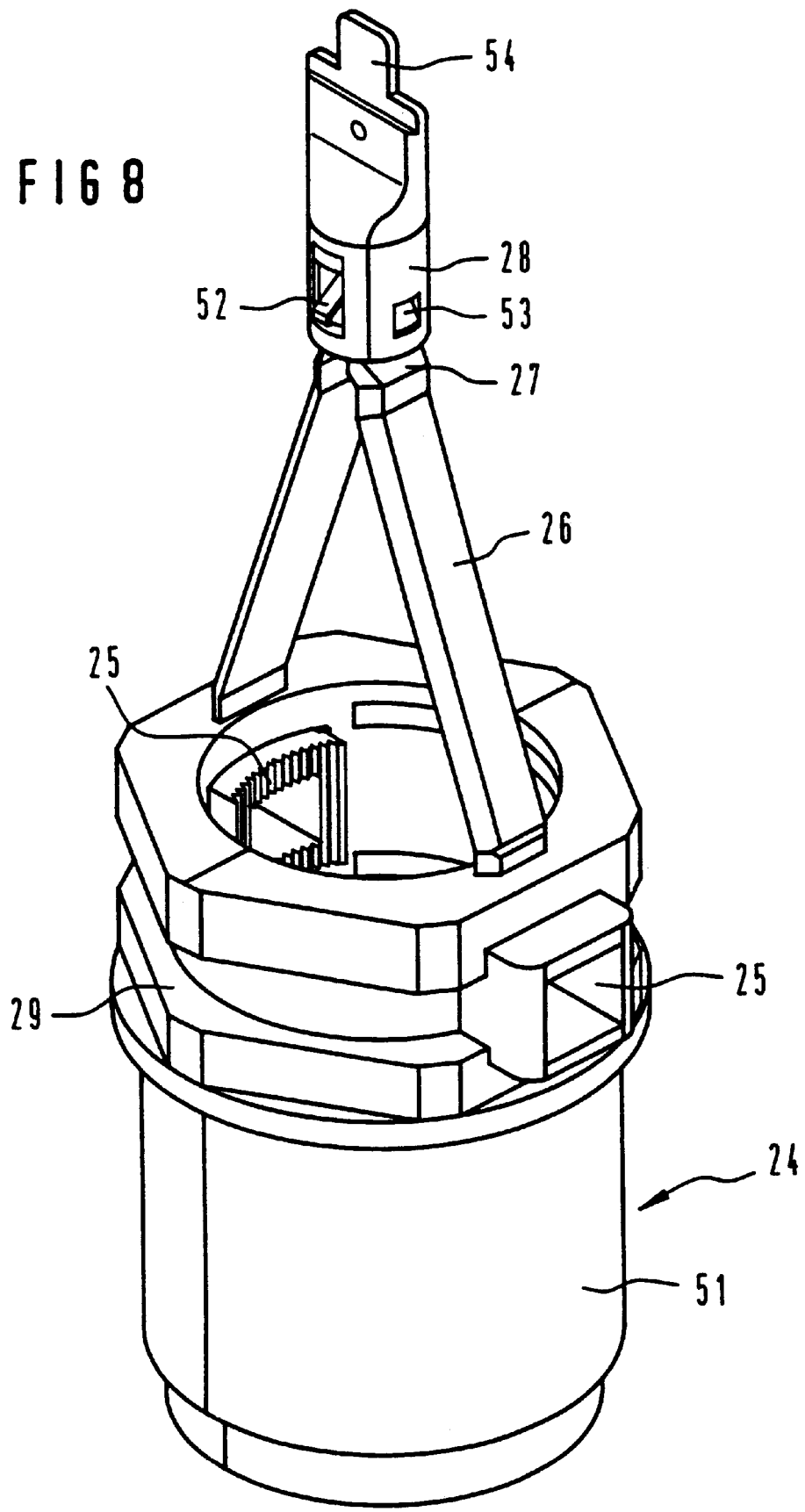
FIG. 8 shows elements for the clamping.

FIG. 8 represents a clamping system for the cable sheath and the central element of an optical cable in detail. The cylindrical sleeve part 24 is screwed with a thread 51 into the thread of a cable inlet and is thus firmly fixed on the terminating plate of the sealing body and thereby compresses the cable inlet seals. Arranged at the upper end of the sleeve part 24 is a circumferential groove 29, in which the pressure pieces 25 project inward through radial openings. Following the insertion of a cable, the pressure pieces 25, which additionally have sharp-edged profiles on the inwardly directed surfaces, are pressed onto the cable sheath with the aid of a clamping band which is drawn into the groove 29. The cable sheath is thus fixed. On the other hand, the central element of the optical cable is subsequently clamped separately with the aid of band-like extensions 26. A terminating sleeve 28, in which the central element is fixed with the aid of sharp-edged spring elements 52, is placed on the ends 27 of these extensions 26. The terminating sleeve 28 further has latching elements 27 for the purpose of fixing on the ends 27 of the extensions 26. In addition, the terminating sleeve 28 is equipped with an electrical connecting element 54.

Figure 9:
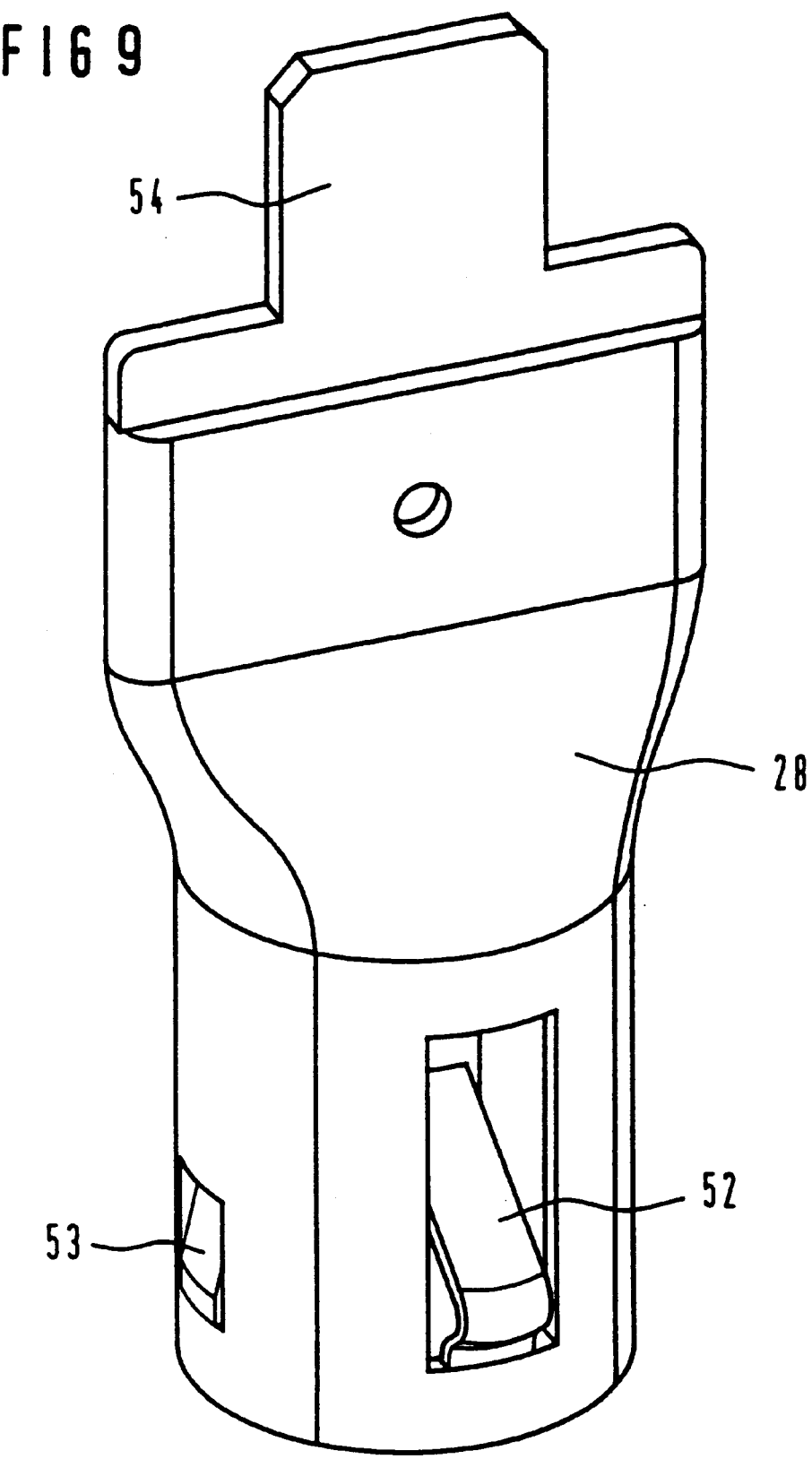
FIG. 9 shows a plug-in sleeve for making ground contact.

FIG. 9 shows the terminating sleeve 28 in detail. To be seen here, in particular, are the spring elements 52, acting as barbs, for gripping the central element, and a clamping element 53. The upper end is designed as a plug contact 54. The central element is pushed from below into the terminating sleeve 28, where it is then gripped and contacted.

Figure 10:
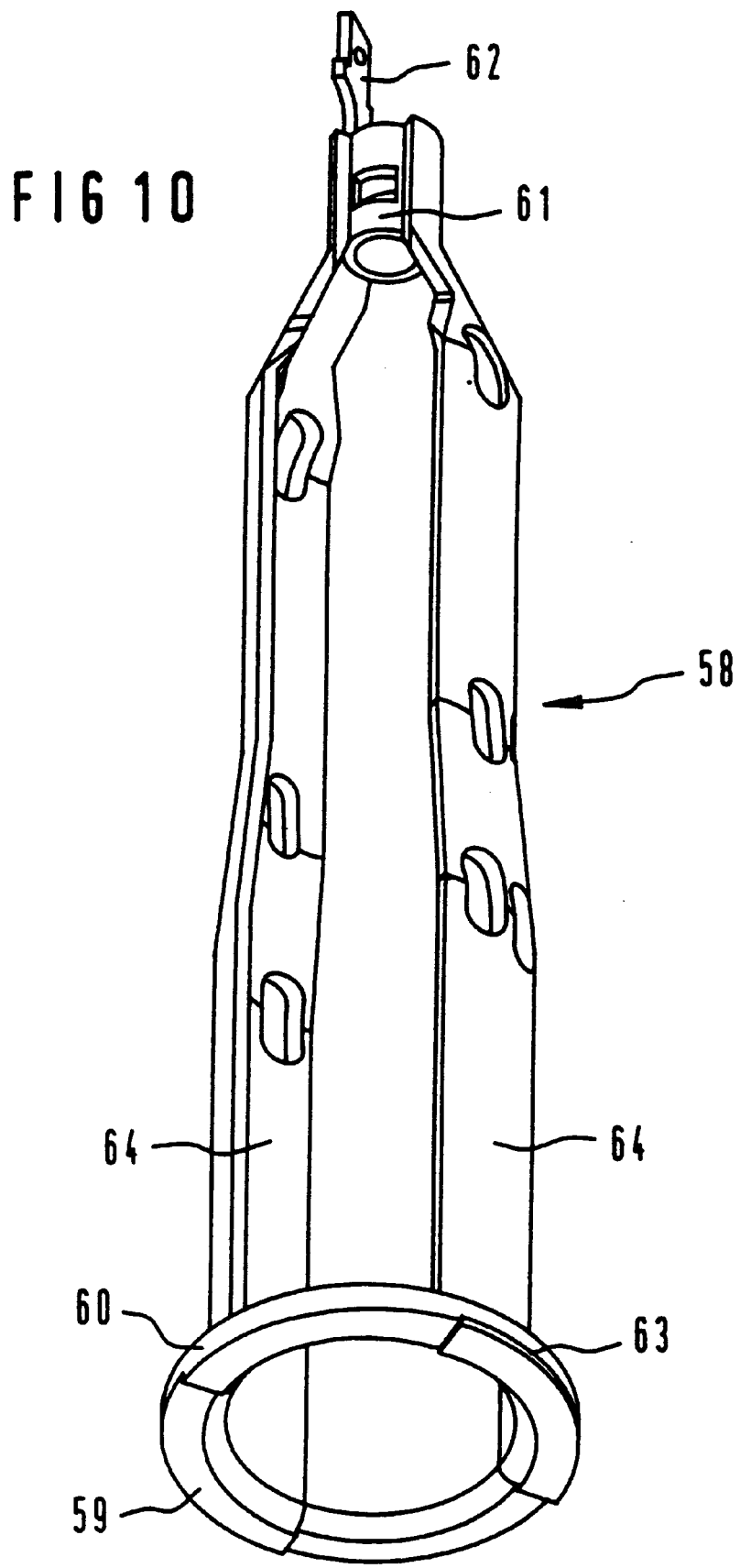
FIG. 10 shows a further exemplary embodiment of clamping elements.
Figure 11:
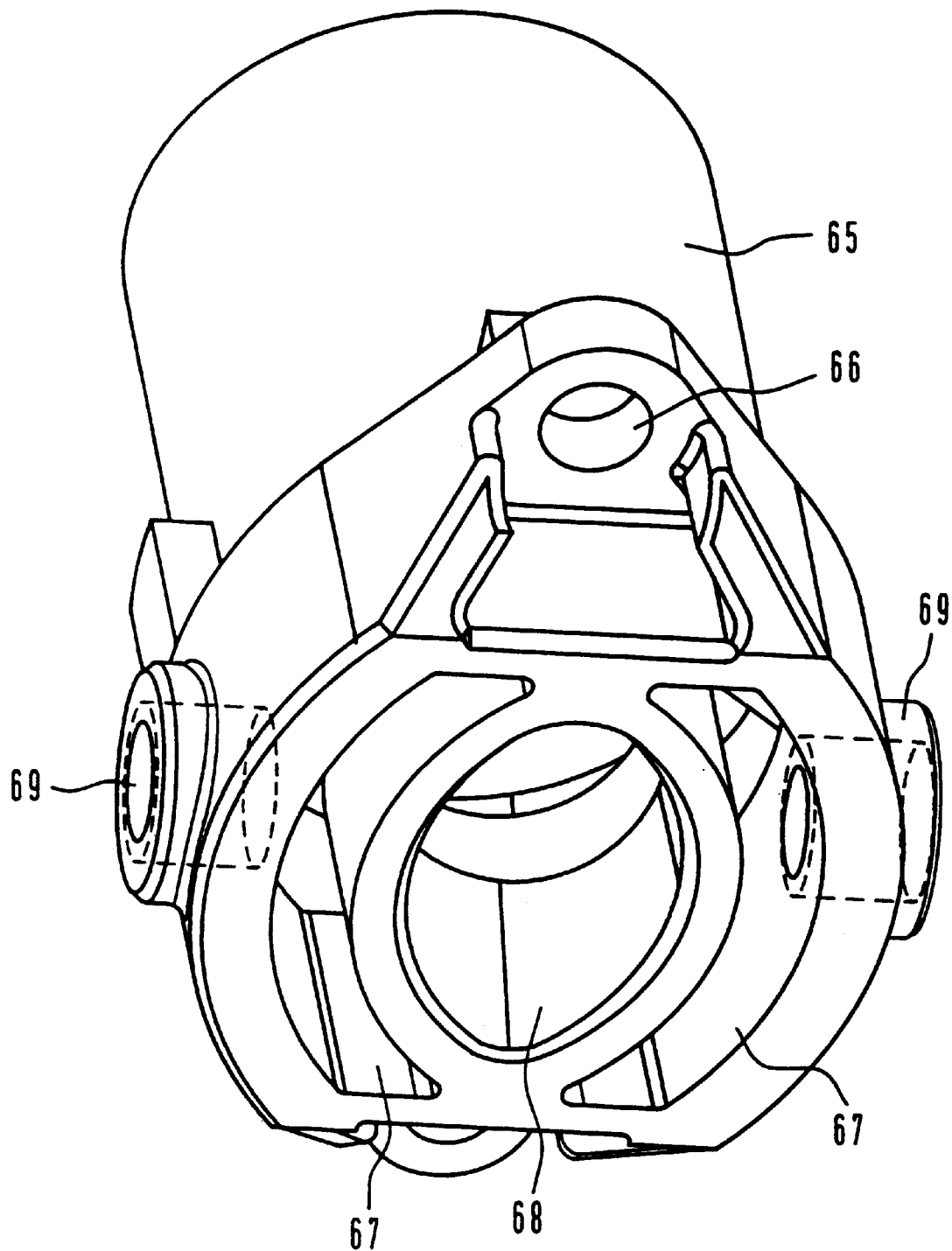
FIG. 11 shows a further exemplary embodiment for cable clamping, in which cable sheath flaps are gripped.

FIG. 10 shows another version of a cable clamping means. It comprises a ring 60, which has recesses 63 into which bent-over part-rings 59 of elongated extension webs 64 engage. This ring, when assembled, is then inserted into a cable inlet and is fixed therein in the axial direction using a threaded ring. The two extension webs 64 are then firmly clamped to the inserted cable sheath using clamping bands, for which purpose the holes which are made can also be used. The extension webs 64 are led together conically and provided with a clamping sleeve 61 for the central element. Here, too, an electrical connection 62 can be provided. The ring 60 can also be divided, so that it can also be employed during the insertion and clamping of uncut cables. Shown in FIG. 11 is a clamping system for a cable sheath, in which slit cable sheath flaps are clamped. This clamping system comprises a sleeve 65, which is fixed either with its free end in turn, in a cable inlet or otherwise using its attached flanges 66. The other end has axially directed slots 67, into which longitudinally slit cable sheath segments are inserted and are fixed with the aid of laterally acting screws 69. The multi-fiber units are led further through the central opening 68.

Figure 12:
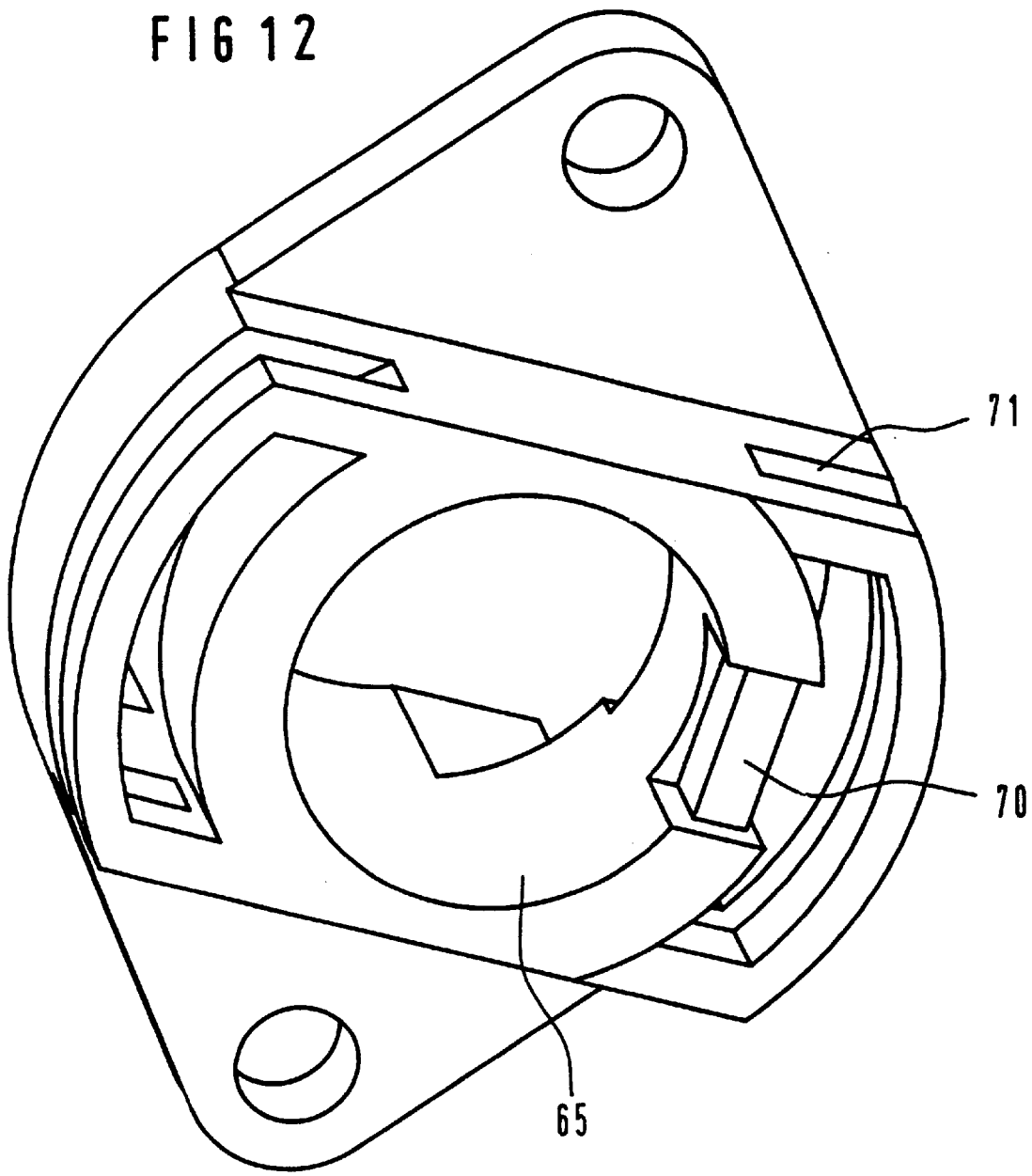
FIG. 12 shows a further exemplary embodiment for a cable clamping means.
Figure 13:
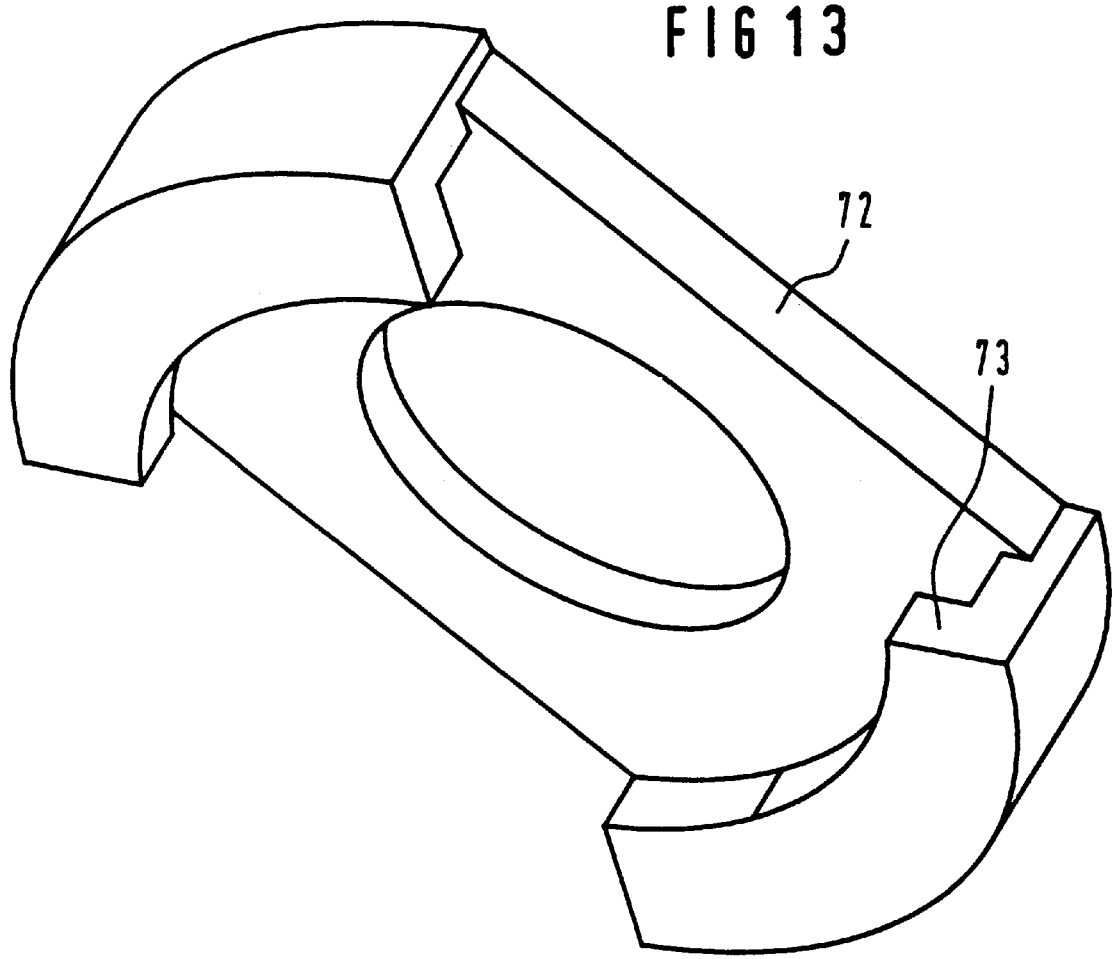
FIG. 13 shows a further exemplary embodiment for a cable clamping means.

FIG. 12 shows a further exemplary embodiment of a cable clamping means, in which by contrast cable sheath segments are gripped in a clamping fashion, but using a terminating piece. As in the case of the previous exemplary embodiment, cable sheath flaps are inserted into axially running slots 67 in the sleeve 65, additional metal inserts 70 for making contact with a cable shield being inserted in these slots 67. The clamping of the cable sheath segments is carried out here with the aid of a clamping piece 72, which engages laterally with attachments 73 in provided slots 71. This clamping piece 72 is shown in more detail in FIG. 13 and is joined in accordance with the outlines.

Figure 14:
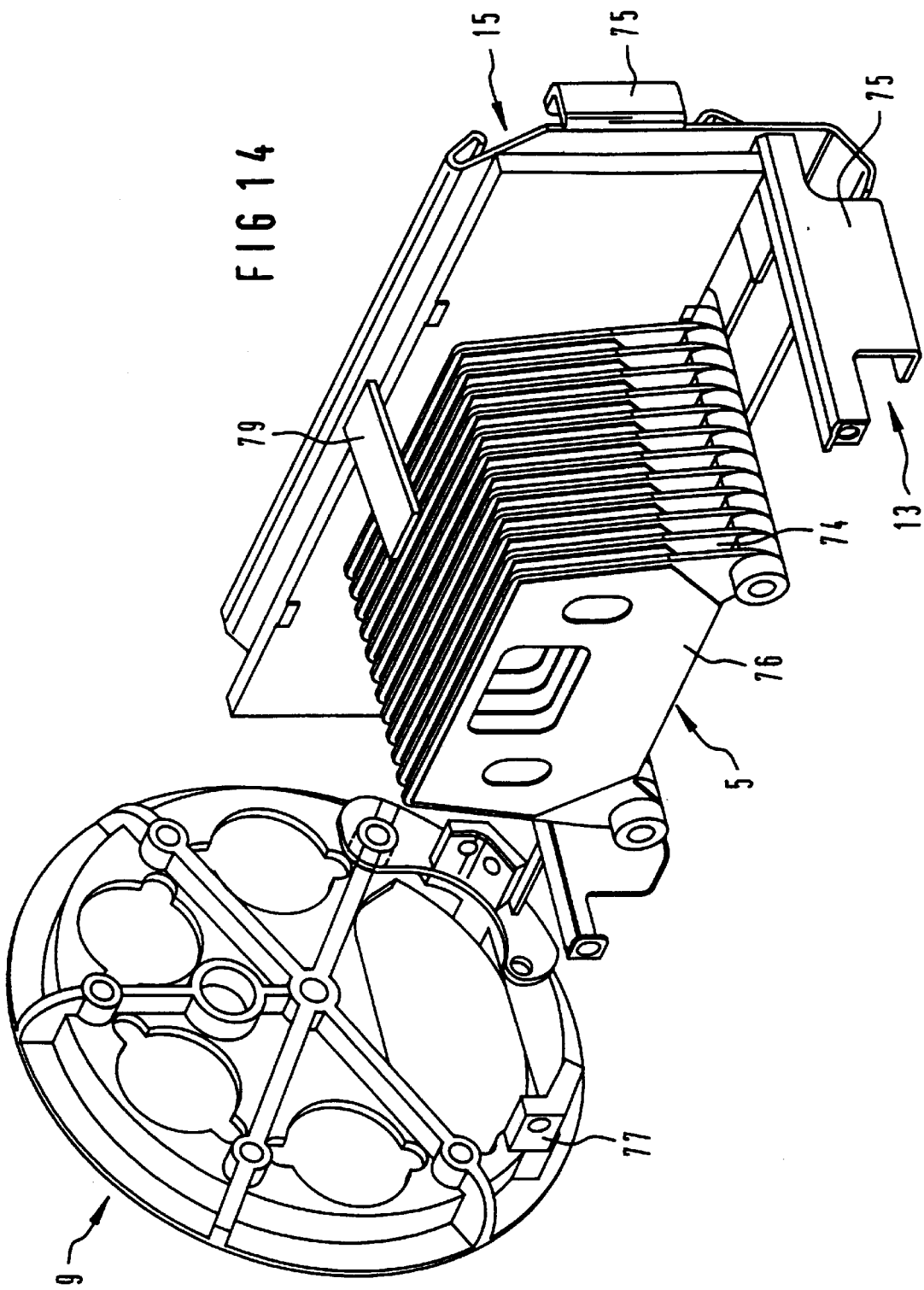
FIG. 14 shows the cassette carrier.

FIG. 14 illustrates the structure of a cassette carrier 5 which, according to the invention, is fastened to corresponding fastening flanges 77 of the pressure plate 9, a rotatable or tiltable arrangement also being able to be provided. In the cassette holder 5 of this design, a plurality of compartments 74 are formed with the aid of plate elements 76 which are arranged in a row at a distance one from another. The individual optical fiber cassettes 6 can now be inserted into these compartments 74 and fixed. In this arrangement it is possible for each cassette to be removed individually for service work, without other cassettes being involved. In addition, two of the supply chambers 13 and 15 are visible, being formed from surface elements whose rims 75 are bent over inward and serve as retaining elements for the inserted bundles of optical fibers. Of course, other arrangements can also be selected in which, for example, the accessibility of the individual cassettes is ensured by means of suitable tilting constructions. In addition, a lock 79 for the cassettes can be provided which, for example, in each case reaches over half of the cassette block. It is arranged either in a plug-in manner or in a pivotable manner above the cassettes and thus secures the cassettes in the cassette carrier in the case of severe shaking or oscillatory loading.

Figure 15:
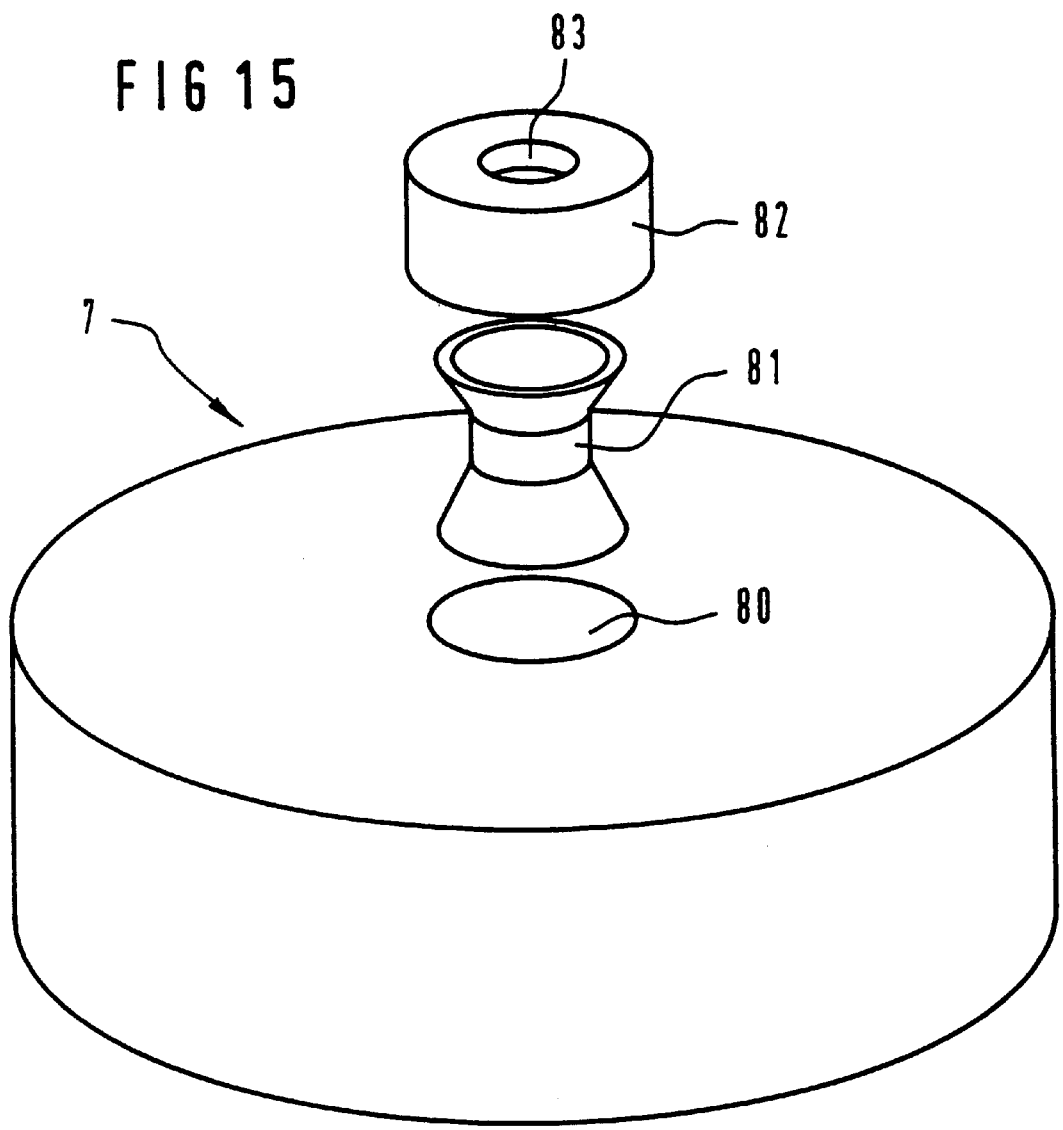
FIG. 15 shows an exemplary embodiment for a seal in a cable inlet.

FIG. 15 shows the seal for the functioning element for actuating the seal unit. For reasons of simplicity, only this seal arrangement is illustrated in this figure. It comprises a cylindrical blind hole 80 in the terminating plate 7 of the hood sleeve, which hole is preferably arranged centrally, a mirror-symmetrical double conical hose-like seal part 81 made of elastic material such as, for example silicone, and a cover 82 in which the entry opening 83 for the leadthrough pin 39 of the functional element shown in FIG. 6 [lacuna]. The activation of the seal is carried out during the actuation of the functional element; this is because during this process the cover 82 is pulled into the blind hole and the seal 81 is compressed in a sealing manner around the pin 39 passing through. The double-conical configuration of the seal part 81 makes it possible for expansion fluctuations in the sealing system to be compensated.

Figure 16:
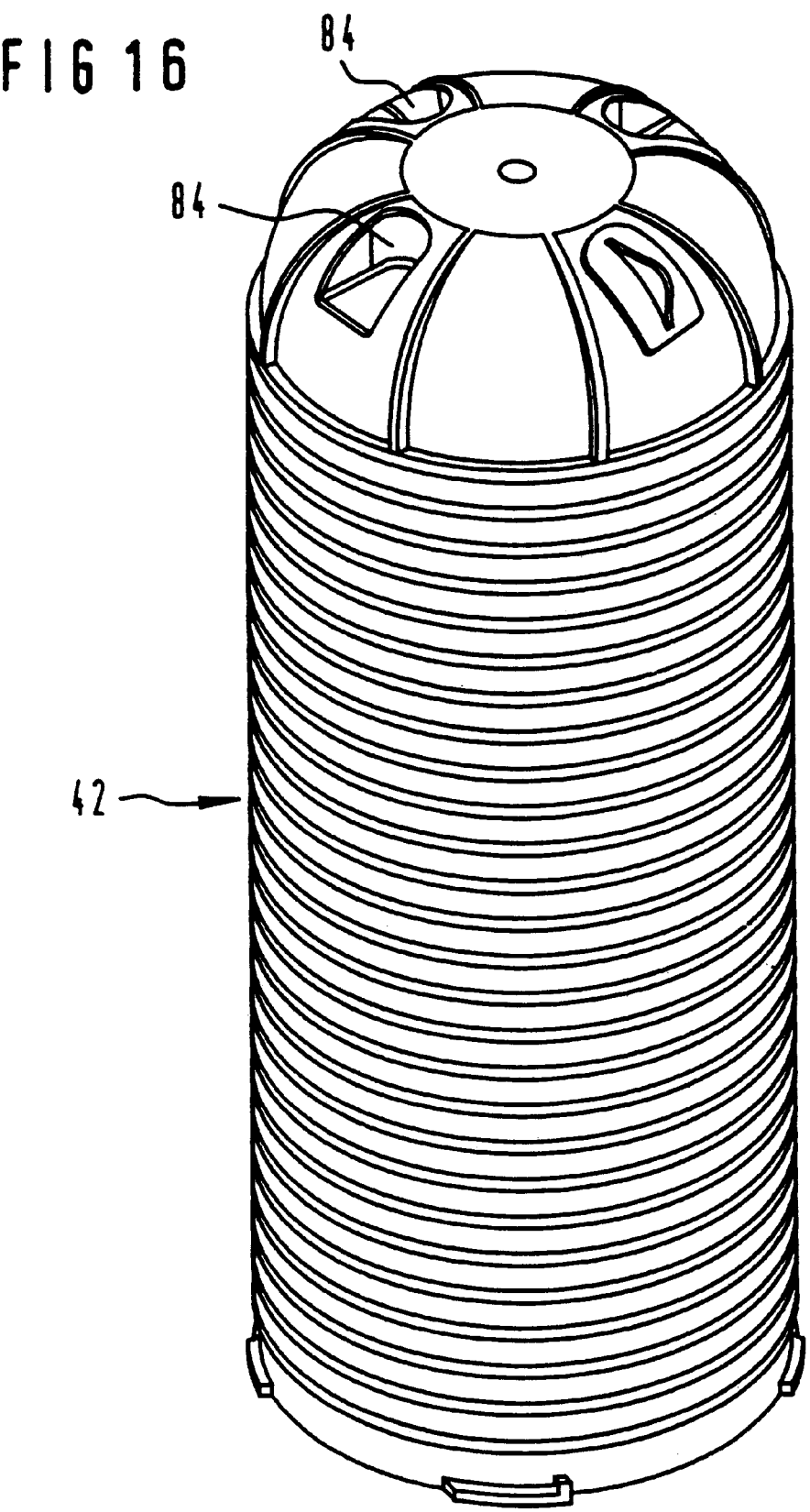
FIG. 16 shows a modified design of the hood body.

FIG. 16 shows an embodiment of the hood body 42 in which, for example, four indentations 84 are arranged. Three thereof are conceived for the engagement of the finger, in order therewith to be able to place the hood body 42 better onto the sealing body and turn it into the bayonet closure. The fourth indentation 84 is provided for a valve, which can be covered with a cap.

FIG. 17 shows a cap 85 for the covering of an indentation 84, provided with a valve, of the hood body 42 (FIG. 17). This cap 85 is plugged with the sleeve part 86 onto the valve, being linked on in a captive manner with the aid of a molded-on film strip 87. In conclusion, reference is made to the fact that the seals in the cable inlets may also be composed of plastic material, the conically designed walls in the sealing regions then being of cylindrical design. This produces a step to the outwardly projecting stubs. This step serves as a counterbearing for the compression of the plastic sealing material. Between the sealing material and the step, a compression, ring matched to the cable diameter of the inserted cable can then be inserted. In the case of the double insertion, an appropriately shaped pressure plate is then to be used.

From the above description, it is apparent that the objects and advantages of the present invention have been achieved. While only certain embodiments have been set forth, alternative embodiments and various modifications will be apparent from the above description to those skilled in the art. For example, the means for sealing the cables in the cable inlets 3, 4 can vary from the specific designs disclosed. In addition, the arrangement of the components inside the hood body 42 may also be varied. These and other alternatives are considered equivalents and within the spirit and scope of the present invention.

We claim:

1. A hood sleeve for accommodating a plurality of optical fiber cables and cassettes, the optical fiber cables including a plurality of optical multifiber units, the hood sleeve comprising:

a hood body having an open end, a closed end and an inner wall, and a sealing body comprising a terminating plate and a pressure plate, the terminating plate being detachably connected to the open end of the hood body with the pressure plate disposed therebetween, the sealing body further comprising a sealing ring sandwiched between the terminating plate and the pressure plate, the terminating plate and the pressure plate being movable relative to one another for deforming the sealing ring in a radially outward direction and against the inner wall of the hood body, the terminating plate comprising a plurality of cable inlets, each cable inlet accommodating an optical fiber cable, each cable inlet comprising a compression seal for providing a seal between the optical fiber cable extending through the inlet.

2. The hood sleeve of claim 1 wherein the hood sleeve further comprises a cassette carrier for accommodating a plurality of cassettes, the cassette carrier being disposed between the closed end of the hood body and the pressure plate.

3. The hood sleeve of claim 2 wherein the hood sleeve further comprises an open space disposed between the pressure plate and the cassette carrier for dividing the optical fiber cables into optical multifiber units.

4. The hood sleeve of claim 3 wherein the hood sleeve further comprises a plurality of supply chambers disposed between the cassette carrier and the inner wall of the hood body for accommodating the optical multifiber units.

5. The hood sleeve of claim 1 wherein the hood body further comprises an outer wall comprising a plurality of stiffening ribs.

6. The hood sleeve of claim 5 wherein at least one of the stiffening ribs comprises a hole for attaching an article to the hood body.

7. The hood sleeve of claim 1 wherein the hood body if fabricated from a mixture of polypropylene and talc.

8. The hood sleeve of claim 1 wherein the terminating plate is connected to the hood body by a bayonet closure having at least one stop.

9. The hood sleeve of claim 1 wherein the hood body further comprises at least opening that accommodates a removable closure valve.

10. The hood sleeve of claim 1 wherein the hood body further comprises a cylindrically shaped opening with a sidewall, the opening accommodating a removable closure valve, the sidewall comprising a cutout portion.

11. The hood sleeve of claim 1 wherein the terminating plate further comprises a hole for accommodating a functional element, the functional element passing through the hole and engaging the pressure plate, pressure on the functional element in a direction from the pressure plate towards the termination plate resulting in movement of the pressure plate towards the restriction plate and deformation of the sealing ring.

12. The hood sleeve of claim 1 wherein the functional element is pulled by a lever that is eccentrically mounted to the functional element, the lever also being removably attachable to the hood sleeve.

13. The hood sleeve of claim 1 wherein the pressure plate is pulled towards the terminating plate thereby deforming the sealing ring by a screw that passes though the terminating plate and threadably engages the pressure plate.

14. The hood sleeve of claim 1 wherein sealing ring is further characterized as having a Shore hardness of greater than 10.

15. The hood sleeve of claim 1 wherein the pressure plate is fabricated from an electrically conductive material.

16. The hood sleeve of claim 1 wherein the pressure plate if fabricated from aluminum.

17. The hood sleeve of claim 1 wherein the pressure plate further comprises at least on ground connection.

18. The hood sleeve of claim 1 wherein the sealing body further comprises a through hole for accommodating a ground connection.

19. The hood sleeve of claim 1 wherein the cable inlets further comprise cylindrical projections.

20. The hood sleeve of claim 1 wherein each cable inlet further comprises cylindrical body and a conically shaped sealing member through which one of the optical fiber cables passes, each cable inlet also comprising a threaded end that threadably accommodates a nut, the nut engaging and compressing the sealing member against the optical fiber cable and the cylindrical body of the inlet.

21. The hood sleeve of claim 1 wherein each cable inlet further comprises cylindrical body, each cylindrical body comprises a profiled pressure piece that is biased inward towards the optical fiber cable that passes through the cable inlet by a compression band that is wrapped around the cylindrical body.

22. The hood sleeve of claim 1 further comprising a clamping system for providing the compression seal between each cable inlet and each optical fiber cable, the clamping system comprising a seal through which the cable passes, an elongated inner sleeve through which the cable and seal passes and a cylindrical body disposed at each cable inlet, each cylindrical body further comprising profiled pressure piece that is biased radially inward against the elongated inner sleeve by a compression band that wraps around the cylindrical body.

23. The hood sleeve of claim 1 wherein the cassette carrier is pivotally connected to the sealing body.

24. The hood sleeve of claim 1 wherein the cassette carrier is detachably connected to the sealing body.

25. The hood sleeve of claim 1 wherein the cassettes are removably attached to the cassette carrier.

26. The hood sleeve of claim 1 wherein the cassettes are pivotally attached to the cassette carrier.

27. A hood sleeve for accommodating a plurality of optical fiber cables and cassettes, the optical fiber cables including a plurality of optical multifiber units, the hood sleeve comprising:

a hood body having an open end, a closed end and an inner wall, and a sealing body comprising a terminating plate and a pressure plate, the terminating plate being detachably connected to the open end of the hood body with the pressure plate disposed therebetween, the sealing body further comprising an annular sealing ring sandwiched between the terminating plate and the pressure plate, the terminating plate and the pressure plate being movable relative to one another for deforming the sealing ring in a radially outward direction and against the inner wall of the hood body, the terminating plate comprising a plurality of cable inlets, each cable inlet accommodating an optical fiber cable, each cable inlet comprising a compression seal for providing a seal between the optical fiber cable extending through the inlet and the inlet, the hood sleeve further comprising a cassette carrier for accommodating a plurality of cassettes, the cassette carrier being disposed between the closed end of the hood body and the pressure plate, the hood sleeve further comprising an open space disposed between the pressure plate and the cassette carrier for dividing the optical fiber cables into optical multifiber units, the hood sleeve further comprising a plurality of supply chambers disposed between the cassette carrier and the inner wall of the hood body for accommodating the optical multifiber units.

28. A hood sleeve for accommodating a plurality of optical fiber cables and cassettes, the optical fiber cables including a plurality of optical multifiber units, the hood sleeve comprising:

a hood body having an open end, a closed end and an inner wall, and a sealing body comprising a terminating plate and a pressure plate, the terminating plate being detachably connected to the open end of the hood body with the pressure plate disposed inside the hood body, the sealing body further comprising an annular sealing ring sandwiched between the terminating plate and the pressure plate, the terminating plate and the pressure plate being movable relative to one another for deforming the sealing ring in a radially outward direction and against the inner wall of the hood body, the sealing body further comprising means for moving the pressure plate towards the terminating plate to compress the sealing ring and causing the sealing ring to sealingly engage the inner wall of the hood body, the terminating plate comprising a plurality of cable inlets, each cable inlet accommodating an optical fiber cable, each cable inlet comprising means for providing a compression seal between the optical fiber cable extending through the inlet and the inlet, the hood sleeve further comprising a cassette carrier for accommodating a plurality of cassettes, the cassette carrier being disposed between the closed end of the hood body and the pressure plate, the hood sleeve further comprising an open space disposed between the pressure plate and the cassette carrier for dividing the optical fiber cables into optical multifiber units, the hood sleeve further comprising a plurality of supply chambers disposed between the cassette carrier and the inner wall of the hood body for accommodating extra portions of the optical multifiber units.

* * * * *